United States Patent
Miyamoto et al.

(10) Patent No.: US 7,183,342 B2
(45) Date of Patent: * Feb. 27, 2007

(54) FLAME-RETARDANT AROMATIC POLYCARBONATE RESIN COMPOSITION

(75) Inventors: Akira Miyamoto, Yokohama (JP);
Toshiharu Sakuma, Kawasaki (JP);
Kazuhiro Shibuya, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/507,071

(22) PCT Filed: Dec. 20, 2002

(86) PCT No.: PCT/JP02/13404

§ 371 (c)(1),
(2), (4) Date: Sep. 9, 2004

(87) PCT Pub. No.: WO03/078525

PCT Pub. Date: Sep. 25, 2003

(65) Prior Publication Data

US 2005/0256227 A1    Nov. 17, 2005

(30) Foreign Application Priority Data

Mar. 18, 2002    (JP) ............................ 2002-074162

(51) Int. Cl.
C08K 3/20     (2006.01)
C08K 3/22     (2006.01)
C08K 5/32     (2006.01)

(52) U.S. Cl. ...................... 524/161; 524/430; 524/492; 524/493

(58) Field of Classification Search ................ 524/161, 524/492–494, 430; 523/216, 212, 209
See application file for complete search history.

(56) References Cited

U.S. PATENT DOCUMENTS

| | | | |
|---|---|---|---|
| 4,391,935 A | | 7/1983 | Bialous et al. |
| 4,544,677 A | * | 10/1985 | Allen et al. .................. 521/91 |
| 5,274,017 A | | 12/1993 | Pan |
| 6,072,011 A | * | 6/2000 | Hoover ....................... 525/464 |
| 6,518,357 B1 | * | 2/2003 | Rajagopalan et al. ....... 524/588 |
| 6,664,313 B2 | * | 12/2003 | Hirai et al. ................. 523/209 |
| 7,060,780 B2 | * | 6/2006 | Miyamoto et al. .......... 528/196 |
| 2005/0154103 A1 | * | 7/2005 | Shibuya et al. ............. 524/284 |
| 2005/0159518 A1 | * | 7/2005 | Miyamoto et al. .......... 524/155 |

FOREIGN PATENT DOCUMENTS

| | | |
|---|---|---|
| EP | 829521 A1 | 3/1998 |
| JP | 530-25660 | 3/1978 |
| JP | 2001-40202 A | 2/2001 |
| JP | 2001-152030 A | 6/2001 |
| JP | 2001-270983 A | 10/2001 |
| JP | 2002-60610 A | 2/2002 |
| WO | WO 00/34371 A1 | 6/2000 |
| WO | WO 00/50511 A1 | 8/2000 |

* cited by examiner

*Primary Examiner*—Peter Szekely
(74) *Attorney, Agent, or Firm*—Birch, Stewart, Kolasch & Birch, LLP

(57) ABSTRACT

A flame retardant aromatic polycarbonate resin composition comprising 100 parts by weight of an aromatic polycarbonate (A), 0.01 to 0.5 part by weight of branched metal oxide particles (branched metal oxide aggregates and/or branched metal oxide agglomerates) (B), 0.0001 to 0.2 part by weight of an alkali metal salt (C) of an organic sulfonic acid, and 0.01 to 0.5 part by weight of a fluoropolymer (D), the branched metal oxide particles (B) being dispersed in a mixture of components (A), (C) and (D), wherein at least 70% of the branched metal oxide particles (B) have a diameter within the range of from 10 to 200 nm.

7 Claims, 3 Drawing Sheets

FLAME-RETARDANT AROMATIC POLYCARBONATE RESIN COMPOSITION

BACKGROUND OF THE INVENTION

1. Field of the Invention

The present invention relates to a flame retardant aromatic polycarbonate resin composition. More particularly, the present invention is concerned with a flame retardant aromatic polycarbonate resin composition comprising an aromatic polycarbonate (A), branched metal oxide particles (B), each independently being a branched metal oxide aggregate or a branched metal oxide agglomerate, an alkali metal salt (C) of an organic sulfonic acid, and a fluoropolymer (D), wherein components (A), (B), (C) and (D) are present in specific amounts, respectively. In the resin composition of the present invention, the branched metal oxide particles (B) are dispersed in a mixture of components (A), (C) and (D), wherein at least 70% of the branched metal oxide particles (B) have a diameter within the range of from 10 to 200 nm. The flame retardant aromatic polycarbonate resin composition of the present invention is advantageous not only in that it exhibits excellent flame retardancy without using a bromine-containing flame retardant or a phosphorus-containing flame retardant, but also in that it exhibits excellent melt stability without sacrificing the excellent thermal resistance and impact resistance which an aromatic polycarbonate inherently possesses.

2. Prior Art

A flame retardant aromatic polycarbonate has been widely used as molding materials for housings or parts of various devices, such as a monitor for a personal computer, a notebook computer, a copying machine, a fax machine, a printer, a projector, a portable device, an electric or electronic device and a high precision machine.

In recent years, with respect to various products produced by using an aromatic polycarbonate resin composition, there is a tendency that the wall thicknesses of the products are reduced for the purpose of reducing the weight of the products. Further, such products are required to have an improved flame retardancy from the viewpoint of safety in the accident of fire.

A flame retardant aromatic polycarbonate resin composition which contains a conventional flame retardant containing bromine, phosphorus or silicone has the following problem. The above-mentioned conventional flame retardant has unsatisfactory thermal stability. Therefore, when melt-molding of the resin composition containing such a conventional flame retardant is performed at high resin temperatures, the heat decomposition of the resin composition vigorously occurs, thereby spoiling the properties of the resin composition.

Therefore, the melt-molding of a flame retardant polycarbonate resin composition needs to be performed at moderate resin temperatures within the range wherein the decomposition of the flame retardant resin composition does not occur. As a specific method for performing the molding at such moderate resin temperatures, there has been proposed a method in which an aromatic polycarbonate is blended with another resin (e.g., as an alloy of an aromatic polycarbonate with an acrylonitrile/butadiene/styrene copolymer (ABS resin)), to thereby improve the balance between the melt fluidity and flame retardancy of the resin composition. This method has already been put to practical use.

However, the method in which an aromatic polycarbonate is blended with another resin has a problem in that the excellent properties (such as heat resistance and impact resistance) inherently possessed by an aromatic polycarbonate are spoiled.

Further, in recent years, from the viewpoint of the environmental protection, it has been strongly desired to develop a flame retardant aromatic polycarbonate resin composition which does not contain a bromine-containing flame retardant or a phosphorus-containing flame retardant and, therefore, is less harmful to the environment.

As a method for improving the flame retardancy of an aromatic polycarbonate without using a bromine-containing flame retardant or a phosphorus-containing flame retardant, Examined Japanese Patent Application Publication No. Sho 60-38418 (corresponding to U.S. Pat. No. 4,391,935) discloses a resin composition obtained by blending an aromatic polycarbonate with an alkali metal salt or alkaline earth metal salt of an organic acid and a polytetrafluoroethylene.

However, when the aromatic polycarbonate resin composition described in the above-mentioned patent document is used for obtaining a molded article having a small wall thickness (hereinafter, simply referred to as a "thin molded article"), the following problem arises. For obtaining a thin molded article which has satisfactory excellent flame retardancy, it is necessary to increase the amounts of the above-mentioned metal salt and polytetrafluoroethylene in the resin composition. However, the use of large amounts of the above-mentioned metal salt and polytetrafluoroethylene disadvantageously lowers the melt stability of the resin composition.

Unexamined Japanese Patent Application Laid-Open Specification No. 2001-270983 discloses a resin composition obtained by blending an aromatic polycarbonate with an organosiloxane compound, a fluorine-containing compound and an alkali metal salt of an organic acid. However, since the thermal stability of the organosiloxane compound is unsatisfactory, the melt stability of the resin composition is also unsatisfactory.

Unexamined Japanese Patent Application Laid-Open Specification No. 2001-40202 discloses a resin composition obtained by blending an aromatic polycarbonate with a core-shell graft rubber, a fluorine-containing compound and an alkali metal salt of an organic acid. However, since the thermal stability of the core-shell graft rubber is unsatisfactory, the melt stability of the resin composition is also unsatisfactory.

On the other hand, there is proposed a method in which an aromatic polycarbonate is blended with nanometer-size particles of an inorganic compound.

For example, Unexamined Japanese Patent Application Laid-Open Specification No. Sho 53-25660 discloses a method in which fine particles (having an average particle diameter of 100 nm or less) of an inorganic substance are incorporated into a flame retardant synthetic resin composition. However, since a bromine-containing flame retardant or a phosphorus-containing flame retardant is used in the flame retardant synthetic resin composition, not only is the resin composition disadvantageous from the viewpoint of the environmental protection, but also the dripping of flaming particles cannot be satisfactorily prevented when a molded article obtained from the resin composition is on fire.

WO00/34371 discloses a method in which silicon compound particles having an average particle diameter of 1 nm to 20 μm are incorporated into a flame retardant aromatic polycarbonate resin composition. However, in the working examples of this patent document, a phosphorus-containing flame retardant is used. Therefore, not only is the resin composition obtained in this patent document disadvantageous from the viewpoint of the environmental protection, but also the excellent properties (such as heat resistance and impact resistance) inherently possessed by an aromatic polycarbonate are spoiled.

U.S. Pat. No. 5,274,017, WO00/50511 and Unexamined Japanese Patent Application Laid-Open Specification Nos. 2001-152030 and 2002-60610 disclose a resin composition obtained by blending a thermoplastic resin with fine particles of an inorganic compound. However, the resin composition disclosed in each of these patent documents poses a problem in that a thin molded article obtained from the resin composition exhibits unsatisfactory flame retardancy or the melt stability of the resin composition is unsatisfactory.

Thus, the conventional flame retardant aromatic polycarbonate resin composition has a problem in that the melt stability of the resin composition is poor due to the unsatisfactory thermal stability of a flame retardant used or due to the use of a flame retardant in a large amount which is needed for achieving a high flame retardancy, so that the properties of a shaped article produced from the resin composition are spoiled.

Therefore, it has been desired to develop an aromatic polycarbonate resin composition which exhibits an excellent flame retardancy without using a bromine-containing flame retardant or a phosphorus-containing flame retardant, and exhibits an excellent melt stability without sacrificing the excellent heat resistance or impact resistance which an aromatic polycarbonate inherently possesses.

SUMMARY OF THE INVENTION

In this situation, the present inventors have made extensive and intensive studies with a view toward solving the above-mentioned problems accompanying the prior art. As a result, it has been found that a flame retardant aromatic polycarbonate resin composition having a specific formulation not only exhibits an excellent flame retardancy without using a bromine-containing flame retardant or a phosphorus-containing flame retardant, but also exhibits an excellent melt stability without sacrificing the excellent thermal resistance and impact resistance which an aromatic polycarbonate inherently possesses. The above-mentioned flame retardant aromatic polycarbonate resin composition having a specific formulation comprises an aromatic polycarbonate (A), branched metal oxide particles (B), each independently being a branched metal oxide aggregate and/or a branched metal oxide agglomerate, an alkali metal salt (C) of an organic sulfonic acid, and an a fluoropolymer (D), wherein components (A), (B), (C) and (D) are present in specific amounts, respectively. In the resin composition, the branched metal oxide particles (B) are dispersed in a mixture of components (A), (C) and (D), wherein at least 70% of the branched metal oxide particles (B) have a diameter within the range of from 10 to 200 nm. The present invention has been completed, based on these novel findings.

Accordingly, it is a primary object of the present invention to provide a flame retardant aromatic polycarbonate resin composition which not only exhibits excellent flame retardancy without using a bromine-containing flame retardant or a phosphorus-containing flame retardant, but also exhibits excellent melt stability without sacrificing the excellent thermal resistance and impact resistance which an aromatic polycarbonate inherently possesses.

The foregoing and other objects, features and advantages of the present invention will be apparent to those skilled in the art from the following detailed description taken in connection with the accompanying drawings and the appended claims.

BRIEF DESCRIPTION OF THE DRAWING

In FIG. 2, black portions are branched metal oxide particles (B) and the remainder is a matrix comprising an aromatic polycarbonate (A), an alkali metal salt (C) of an organic sulfonic acid and a fluoropolymer (D).

DETAILED DESCRIPTION OF THE INVENTION

Figure 1:
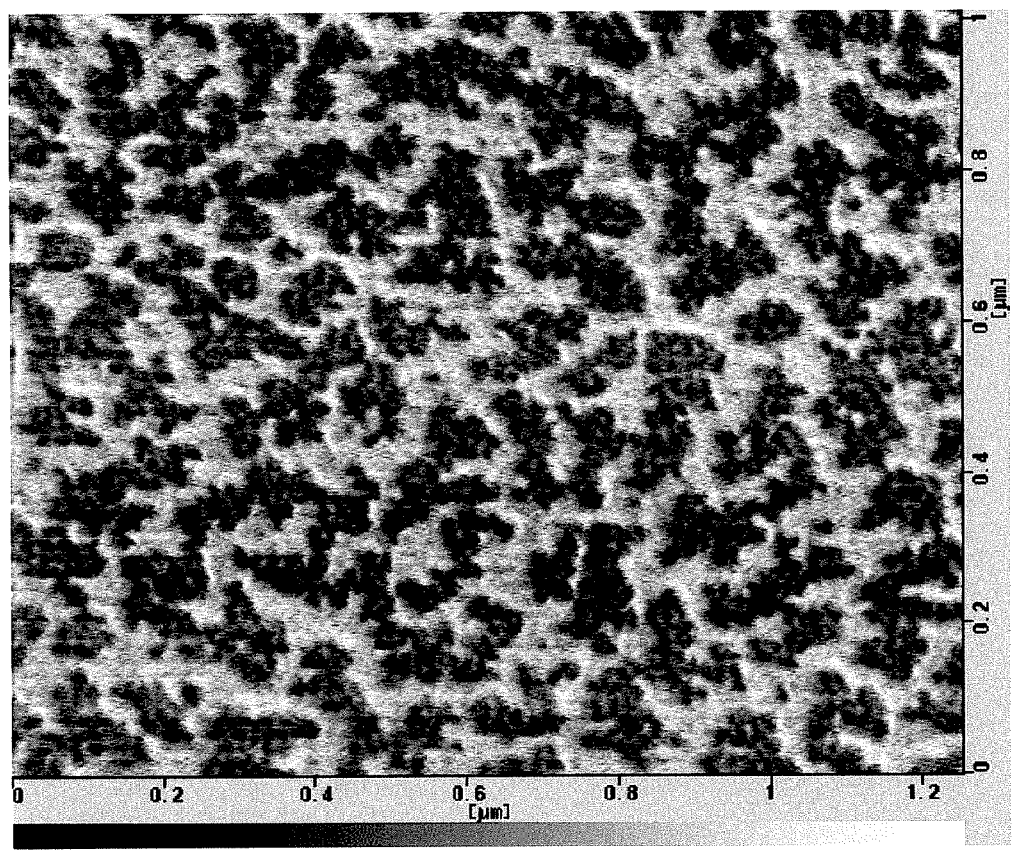
FIG. 1 is a photomicrograph (taken using a scanning probe microscope) of the surface of a 1/16 inch-thick test specimen which was produced by molding a flame retardant aromatic polycarbonate resin composition obtained in substantially the same manner as in Example 4, except that component (C) was changed to potassium perfluorobutane sulfonate (tradename: RM-65; manufactured end sold by MITENI S.p.A., Italy), and which was subjected to the 20 mm Vertical Burning Test described in UL-Subject 94. In the 20 mm Vertical Burning Test, the test specimen was self-extinguished 3 seconds after the second contact (10 seconds) with fire, and the flame retardancy of the test specimen was "V-0". In the photomicrograph of FIG. 1, black portions are branched metal oxide particles (B) and the remainder is a matrix comprising an aromatic polycarbonate (A), an alkali metal salt (C) of an organic sulfonic acid and a fluoropolymer (D). Further, on the photomicrograph of FIG. 1, the total area of the metal oxide particles as component (B) is 56%, based on the area of the photomicrograph.

In one aspect of the present invention, there is provided a flame retardant aromatic polycarbonate resin composition comprising: 100 parts by weight of an aromatic polycarbonate (A), 0.01 to 0.5 part by weight of branched metal oxide particles (B), each independently being a branched metal oxide aggregate or a branched metal oxide agglomerate, 0.0001 to 0.2 part by weight of an alkali metal salt (C) of an organic sulfonic acid, and 0.01 to 0.5 part by weight of a fluoropolymer (D), the branched metal oxide particles (B) being dispersed in a mixture of the aromatic polycarbonate (A), the alkali metal salt (C) and the fluoropolymer (D), wherein at least 70% of the branched metal oxide particles (B) have a diameter within the range of from 10 to 200 nm.

For easy understanding of the present invention, the essential features and various preferred embodiments of the present invention are enumerated below.

1. A flame retardant aromatic polycarbonate resin composition comprising:
   100 parts by weight of an aromatic polycarbonate (A),
   0.01 to 0.5 part by weight of branched metal oxide particles (B), each independently being a branched metal oxide aggregate or a branched metal oxide agglomerate,
   0.0001 to 0.2 part by weight of an alkali metal salt (C) of an organic sulfonic acid, and
   0.01 to 0.5 part by weight of a fluoropolymer (D),
   the branched metal oxide particles (B) being dispersed in a mixture of the aromatic polycarbonate (A), the alkali metal salt (C) and the fluoropolymer (D),
   wherein at least 70% of the branched metal oxide particles (B) have a diameter within the range of from 10 to 200 nm.
2. The composition according to item 1 above, wherein the branched metal oxide particles (B) are branched particles of at least one metal oxide selected from the group consisting of a silicon oxide, a titanium oxide and an aluminum oxide.
3. The composition according to item 2 above, wherein the branched metal oxide particles (B) are branched silicon oxide particles produced by the dry method.
4. The composition according to any one of items 1 to 3 above, wherein the surfaces of the branched metal oxide particles (B) are modified with a silicon compound.
5. The composition according to any one of items 1 to 4 above, which further comprises 5 to 200 parts by weight of an additive (E) selected from the group consisting of a reinforcing agent and a filler.
6. The composition according to item 5 above, wherein the additive (E) is at least one substance selected from the group consisting of a glass fiber, a carbon fiber, glass flakes, glass beads, glass balloons, a quartz glass and silica.
7. The composition according to any one of items 1 to 6 above, wherein the aromatic polycarbonate (A) is produced by a transesterification process.

Hereinbelow, the present invention will be described in detail.

The aromatic polycarbonate which can be used as the resin component (A) in the flame retardant polycarbonate resin composition of the present invention comprises recurring units each independently represented by the following formula (1):

(1)

wherein Ar represents a divalent aromatic group having 5 to 200 carbon atoms.

Examples of divalent aromatic groups Ar include a phenylene group, a naphthylene group, a biphenylene group and a pyridylene group, which are unsubstituted or substituted with at least one substituent as described below, and include a group represented by the following formula (2):

$$—Ar^1—Y—Ar^2—$$ (2)

wherein each of $Ar^1$ and $Ar^2$ independently represents an arylene group, such as a phenylene group, a naphthylene group, a biphenylene group or a pyridylene group, which is unsubstituted or substituted with at least one substituent as described below, and Y represents an unsubstituted or substituted alkylene group represented by any one of the following formulae (3):

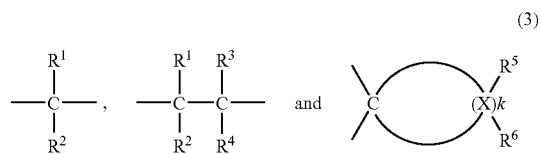

(3)

wherein each of $R^1$, $R^2$, $R^3$ and $R^4$ independently represents a hydrogen atom, a lower alkyl group having 1 to 6 carbon atoms, a cycloalkyl group having 5 to 10 carbon atoms, an aryl group having 6 to 30 carbon atoms or an aralkyl group having 7 to 31 carbon atoms, which may be substituted with a halogen atom or an alkoxy group having 1 to 10 carbon atoms; k represents an integer of from 3 to 11; each X represents a carbon atom and has $R^5$ and $R^6$ bonded thereto; each $R^5$ independently represents a hydrogen atom, a lower alkyl group having 1 to 6 carbon atoms or an aryl group having 6 to 30 carbon atoms, and each $R^6$ independently represents a hydrogen atom, a lower alkyl group having 1 to 6 carbon atoms or an aryl group having 6 to 30 carbon atoms; and wherein each of $R^1$, $R^2$, $R^3$, $R^4$, $R^5$ and $R^6$ may be substituted with a halogen atom and/or an alkoxy group having 1 to 10 carbon atoms.

The aromatic polycarbonate used in the present invention may contain, as a comonomer unit, a divalent aromatic group represented by the following formula (4):

$$—Ar^1—Z—Ar^2—$$ (4)

wherein $Ar^1$ and $Ar^2$ are as defined in formula (2) above; and Z represents a single bond, or a divalent group, such as —O—, —CO—, —S—, —SO$_2$—, —CO$_2$—, or —CON(R$^1$)—, wherein $R^1$ is as defined in formula (3) above.

Specific examples of divalent aromatic groups represented by formula (2) above include groups respectively represented by the following formulae:

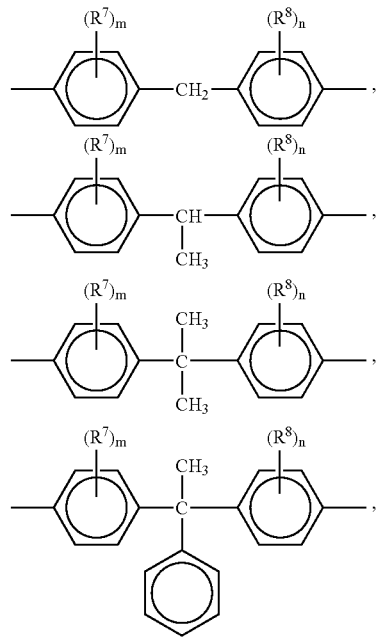

-continued

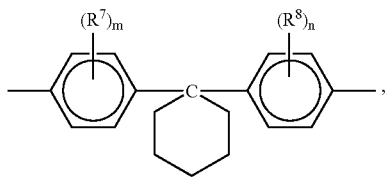

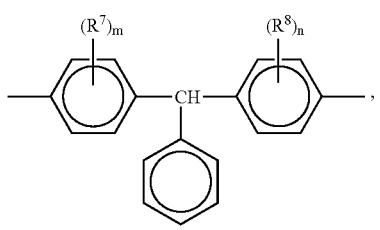

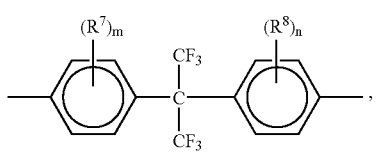

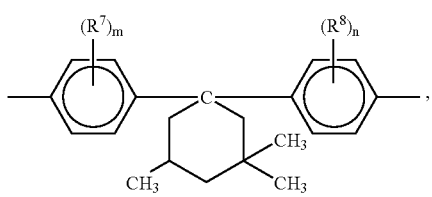

-continued

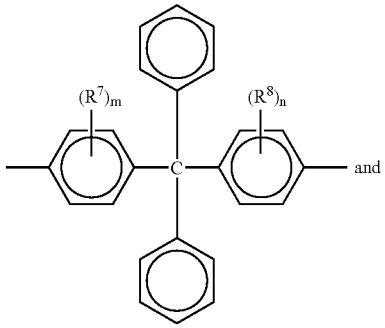
and

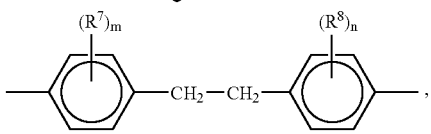

wherein each of substituent $R^7$ and substituent $R^8$ independently represents a halogen atom, an alkyl group having 1 to 10 carbon atoms, an alkoxy group having 1 to 10 carbon atoms, a cycloalkyl group having 5 to 10 carbon atoms, or an aryl group having 6 to 30 carbon atoms; each of m and n independently represents an integer of from 1 to 4, with the proviso that when m is an integer of from 2 to 4, the $R^7$'s are the same or different, and when n is an integer of from 2 to 4, the $R^8$'s are the same or different.

Specific examples of divalent aromatic groups represented by formula (4) above include groups respectively represented by the following formulae:

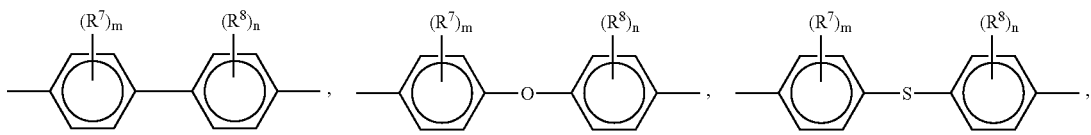

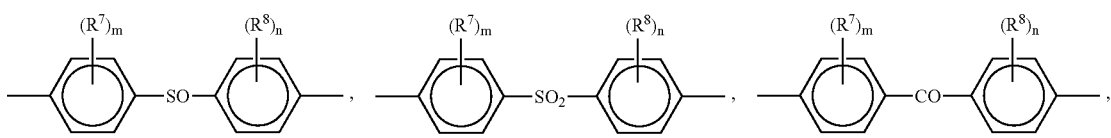

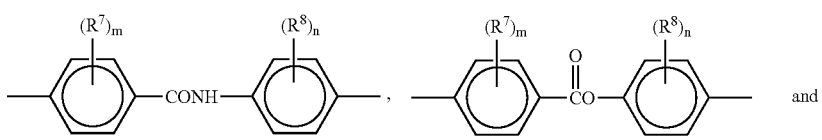
and

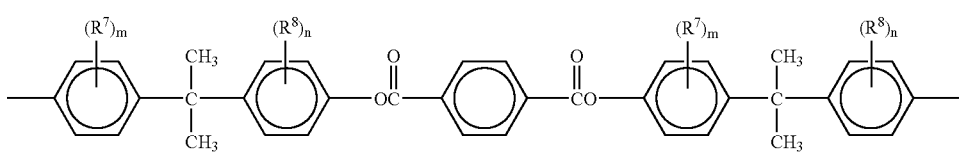

wherein $R^7$, $R^8$, m and n are as defined above.

A preferred example of divalent aromatic groups is a group represented by the following formula (5):

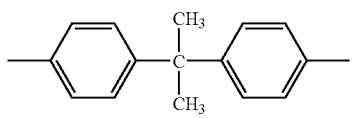
(5)

It is especially preferred that the aromatic polycarbonate contain 85 mole % or more, based on all of the monomer units in the aromatic polycarbonate, of recurring units each having an Ar represented by the above formula (5).

The aromatic polycarbonate used in the present invention may be branched at a tri- or more valent aromatic group.

With respect to the molecular structures of the terminal groups of the aromatic polycarbonate, there is no particular limitation. The terminal groups of the aromatic polycarbonate may be at least one member selected from the group consisting of a phenolic group, an aryl carbonate group and an alkyl carbonate group. A terminal aryl carbonate group is represented by the following formula (6):

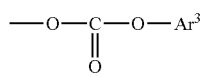
(6)

wherein $Ar^3$ represents a monovalent aromatic group having 6 to 30 carbon atoms, wherein the aromatic ring of $Ar^3$ may be unsubstituted or substituted.

Specific examples of terminal aryl carbonate groups include groups respectively represented by the following formulae:

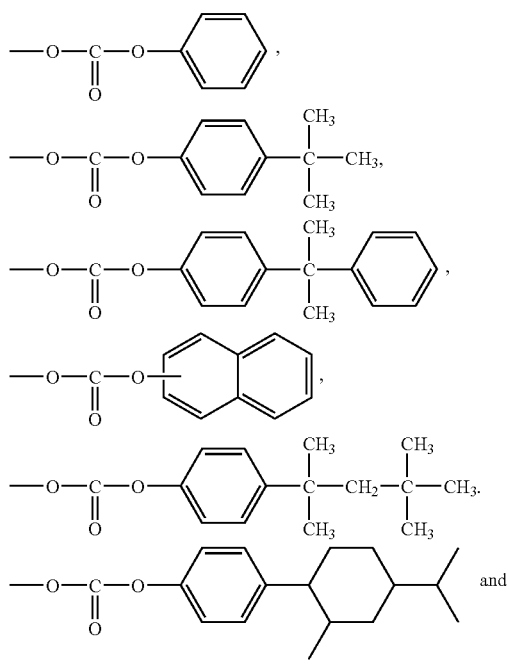

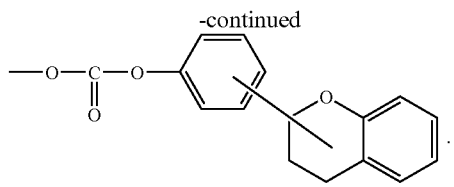

A terminal alkyl carbonate group is represented by the following formula (7):

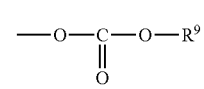
(7)

wherein $R^9$ represents a straight chain or branched alkyl group having 1 to 20 carbon atoms.

Specific examples of terminal alkyl carbonate groups include groups respectively represented by the following formulae:

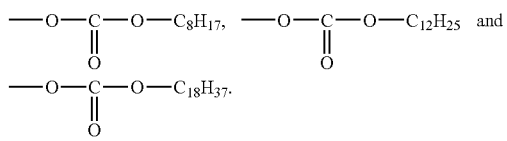

Among these terminal groups, preferred terminal groups are a phenolic group, a phenyl carbonate group, a p-t-butylphenyl carbonate group and a p-cumylphenyl carbonate group.

With respect to the ratio of the terminal phenolic groups to the other terminal groups, there is no particular limitation. However, from the viewpoint of causing the resin composition to exhibit an excellent flame retardancy and an excellent melt fluidity in a good balance, it is preferred that the amount of the terminal phenolic groups is in the range of from 5 to 70%, more advantageously from 10 to 50%, based on the number of all terminal groups.

As methods for determining the amount of the terminal phenolic groups, there are generally known a method using NMR (NMR method), a method using titanium (titanium method) and a method using UV or IR (UV method or IR method). In the present invention, the amount of the terminal phenolic groups is determined by the NMR method.

With respect to the aromatic polycarbonate (A) used in the present invention, the weight average molecular weight (Mw) of the aromatic polycarbonate is generally from 5,000 to 500,000, preferably from 10,000 to 100,000, more preferably from 13,000 to 50,000, still more preferably from 15,000 to 30,000, especially preferably from 18,000 to 25,000 and most preferably from 20,000 to 23,000.

Further, in the present invention, it is also preferred to use, as component (A), two or more types of aromatic polycarbonates having different molecular weights in combination. For example, an aromatic polycarbonate usable as a raw material for producing an optical disk, which in general has a weight average molecular weight (Mw) of from 14,000 to 16,000, can be used in combination with an aromatic polycarbonate usable as a raw material for producing an injection-molded article or an extrusion-molded article, which in general has a weight average molecular weight (Mw) of from 20,000 to 50,000.

In the present invention, the weight average molecular weight (Mw) of the aromatic polycarbonate can be measured by gel permeation chromatography (GPC) as follows. A calibration curve is obtained with respect to standard monodispersed polystyrene samples using a polystyrene gel column and tetrahydrofuran as a solvent. The obtained calibration curve is modified by a calculation using the following formula:

$$M_{PC}=0.3591 M_{PS}^{1.0388}$$

wherein $M_{PC}$ represents the molecular weight of an aromatic polycarbonate and $M_{PS}$ represents the molecular weight of a polystyrene, thereby obtaining a modified calibration curve for an aromatic polycarbonate. The weight average molecular weight of an aromatic polycarbonate is measured by GPC using the obtained modified calibration curve.

In the present invention, aromatic polycarbonates which are used as component (A) can be produced by any conventional method. Examples of conventional methods include an interfacial polymerization process (e.g., phosgene process) in which an aromatic dihydroxy compound and a carbonate precursor (e.g., phosgene) are reacted with each other in the presence of an aqueous sodium hydroxide solution and methylene chloride as a solvent; a transesterification process (melt process) in which an aromatic dihydroxy compound and a carbonic diester (e.g., diphenyl carbonate) are reacted with each other; a solid-phase polymerization process in which a carbonate prepolymer obtained by the phosgene process or by the melt process is crystallized and subjected to a solid-phase polymerization (see Unexamined Japanese Patent Application Laid-Open Specification No. Hei 1-158033 (corresponding to U.S. Pat. No. 4,948,871)), Unexamined Japanese Patent Application Laid-Open Specification No. Hei 1-271426, and Unexamined Japanese Patent Application Laid-Open Specification No. Hei 3-68627 (corresponding to U.S. Pat. No. 5,204,377)).

As an aromatic polycarbonate resin which is especially preferred as component (A), there can be mentioned an aromatic polycarbonate resin produced from a dihydric phenol (an aromatic dihydroxy compound) and a carbonic diester by a transesterification process. Such an aromatic polycarbonate resin contains substantially no chlorine atoms.

The amount of the terminal phenolic groups of an aromatic polycarbonate can be controlled by a conventional method. Specifically, in the phosgene process, the amount of the terminal phenolic groups can be controlled, for example, by the method described in U.S. Pat. No. 4,736,013. On the other hand, in the transesterification process, such as the above-mentioned melt process or solid-phase polymerization process, the amount of the terminal phenolic groups can be controlled by adjusting a molar ratio between an aromatic dihydroxy compound and a diphenyl carbonate or by the method described in Examined Japanese Patent Application Publication No. Hei 7-98862.

In the present invention, from the viewpoint of improving the melt fluidity of the resin composition, it is preferred to use, as component (A), an aromatic polycarbonate having a branched structure in a main chain thereof. As a method for producing an aromatic polycarbonate having a branched structure, there can be mentioned a method in which a tri- or more valent hydroxy compound is used as a comonomer (see, for example, methods described in U.S. Pat. Nos. 4,677,162 and 4,562,242, and German Patent No. 3,149,812). However, in the present invention, it is preferred to use an aromatic polycarbonate having a branched structure, which is produced by the method described in U.S. Pat. No. 5,932,683.

More specifically, in the present invention, for obtaining a resin composition which exhibits an excellent flame retardancy and an excellent melt fluidity in an excellent balance, it is preferred to use an aromatic polycarbonate containing a recurring unit having a branched structure (hereinafter, referred to as a "heterounit"), which is represented by the following formula (8):

wherein Ar' represents a trivalent aromatic group having 5 to 200 carbon atoms and X represents a polycarbonate chain comprising recurring units of formula (1) above.

The amount of the above-mentioned heterounit in the aromatic polycarbonate (A) is preferably from 0.01 to 0.5 mol %, more preferably from 0.03 to 0.3 mol %, still more preferably from 0.04 to 0.2 mol %, most preferably from 0.05 to 0.1 mol %, based on the total molar amount of the recurring units of the aromatic polycarbonate.

As a specific example of preferred aromatic polycarbonates, there can be mentioned an aromatic polycarbonate comprising recurring units each represented by the following formula (9):

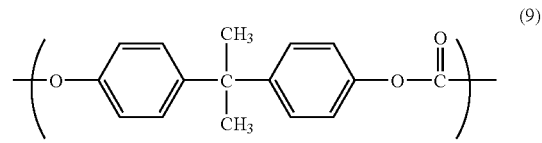

and heterounits each represented by the following formula (10):

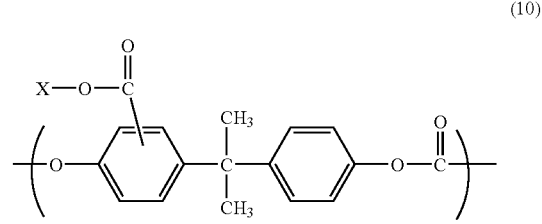

wherein X represents a molecular chain comprising the recurring units of formula (9) above, wherein the amount of the heterounits is preferably from 0.01 to 0.5 mol %, more preferably from 0.03 to 0.3 mol %, still more preferably from 0.04 to 0.2 mol %, most preferably from 0.05 to 0.1 mol %, based on the total molar amount of the recurring units of the aromatic polycarbonate.

Next, an explanation is given below with respect to component (B) used in the resin composition of the present invention.

Component (B) is branched metal oxide particles.

In the present invention, the "branched metal oxide particles" mean aggregates and/or agglomerates of metal oxide primary particles, in which the metal oxide primary particles are bonded together to form branched chains.

In the present invention, the "particles" mean those which are observed as distinct particles in the transmission electron microscopy (TEM) performed with respect to an ultrathin specimen of a resin composition, or in the scanning probe atomic force microscopy (SPM) performed with respect to a surface or cross-section of a molded article of the resin composition (maginification in each of the microscopies is generally from ×10,000 to ×100,000). In each of the above-mentioned microscopies, the branched metal oxide particles (B) which are, as mentioned above, in the form of aggregates and/or agglomerates, are observed as distinct particles.

In the present invention, the particle diameter of branched metal oxide particles (B) can be measured by the above-mentioned TEM or SPM as follows. With respect to each of 100 or more particles on a TEM or SPM photomicrograph of the resin composition, the area (S) thereof is measured. Using the measured areas (S) of the particles, the diameter of each of the particles is calculated by the formula $(4S/\mu)^{0.5}$. Further, using the above-mentioned photomicrograph, the particle diameter distribution can also be determined.

Examples of branched metal oxide particles (B) include particles of silicon oxide, titanium oxide, aluminum oxide, zinc oxide, cerium oxide, yttrium oxide, zirconium oxide, tin oxide, iron oxide, magnesium oxide, manganese oxide and holmium oxide, which are in the form of aggregates and/or agglomerates of primary particles, in which the primary particles are bonded together to form branched chains.

Of these branched particles, branched particles of silicon oxide, titanium oxide and aluminum oxide are preferred, and branched particles of silicon oxide are most preferred.

In the resin composition of the present invention, for causing the resin composition to exhibit a high flame retardancy and an excellent impact resistance, it is necessary that at least 70%, preferably 75% or more, still more preferably 80% or more, most preferably 90% or more, of the branched metal oxide particles (B) have a diameter within the range of from 10 to 200 nm. Further, the number average particle diameter of the metal oxide particles (B) is generally from 30 to 250 nm, preferably from 40 to 200 nm, more preferably from 50 to 150 nm.

In the present invention, it is preferred that the metal oxide particles (B) have a specific surface area (which is measured by the BET method, namely the method based on the BET adsorption isotherm) of from 50 to 400 m$^2$/g, more advantageously from 100 to 350 m$^2$/g, still more advantageously from 150 to 300 m$^2$/g.

As component (B), it is preferred to use branched silicon oxide particles, and it is especially preferred to use branched silicon oxide particles obtained by the so-called "dry method" in which silicon oxide is synthesized by hydrolyzing a volatile silicon compound, such as a silicon halide, at a high temperature in an oxyhydrogen flame. The branched silicon oxide particles produced by the above-mentioned dry method are generally called "fumed silica".

More specifically, the fumed silica can be produced, for example, by a method disclosed in Unexamined Japanese Patent Application Laid-Open Specification No. 2000-86227. Specific examples of methods for producing a fumed silica include a method in which a volatile silicon compound as a raw material is fed to a burner together with a gaseous mixture containing a flammable gas and oxygen gas, to thereby cause a thermal decomposition of the volatile silicon compound at a temperature of from 1,000 to 2,100° C., thereby obtaining a fumed silica. Examples of volatile silicon compounds as a raw material include $SiH_4$, $SiCl_4$, $CH_3SiCl_3$, $CH_3SiHCl_2$, $HSiCl_3$, $(CH_3)_2SiCl_2$, $(CH_3)_3SiCl$, $(CH_3)_2SiH_2$, $(CH_3)_3SiH$ and alkoxysilanes. Of these, preferred are halogenated silicon compounds, such as $SiCl_4$, $CH_3SiCl_3$, $CH_3SiHCl_2$, $HSiCl_3$, $(CH_3)_2SiCl_2$ and $(CH_3)_3SiCl$. As the above-mentioned gaseous mixture containing a flammable gas and oxygen gas, it is preferred to use a gaseous mixture which generates water. As a suitable example of such a gaseous mixture, there can be mentioned a mixture of a flammable gas, such as hydrogen gas, methane or butane, and an oxygen-containing gas, such as oxygen gas or air.

It is preferred that the ratio between the volatile silicon compound and the gaseous mixture containing oxygen gas and a flammable gas (e.g., hydrogen gas) is adjusted so that the oxygen gas and the hydrogen gas are used in molar amounts which are, respectively, 2.5 to 3.5 times and 1.5 to 3.5 times the molar equivalents of the oxygen gas and the hydrogen gas, each relative to the volatile silicon compound. The term "molar equivalents of the oxygen gas and the hydrogen gas" means the stoichiometric equivalents of the oxygen gas and the hydrogen gas, which react with the raw material compound (i.e., the volatile silicon compound). When a hydrocarbon fuel, such as methane, is used as a flammable gas, the term "molar equivalent of the hydrogen gas" means the molar equivalent of the hydrocarbon fuel in terms of hydrogen. In this method, primary silica particles having a small average particle diameter can be obtained when the hydrogen gas and the oxygen gas are used in excess amounts, each relative to the amount of the volatile silicon compound, to thereby lower the ratio of the solid (silica) to the gas (oxygen gas and hydrogen gas). Specifically, when the ratio of the solid to the gas is low, the frequency of the collisions among the solid particles can be decreased, to thereby suppress the growth of particles by fusion bonding of particles, so that primary silica particles having a small average particle diameter can be obtained.

With respect to component (B) used in the present invention, it is preferred to modify the surface of component (B) with a silicon compound. The surface modification of component (B) is effective for finely dispersing component (B) in the resin composition by preventing the unfavorable aggregation of component (B) in the resin composition.

In the present invention, the "surface modification" may be either a surface modification in which the silicon compound as a modifier is bonded to compound (B) through a covalent bond, or a surface modification in which the silicon compound as a modifier is bonded to compound (B) by the van der Waals force or through a hydrogen bond; however, the former (i.e., surface modification through a covalent bond) is preferred.

As the silicon compound used as a modifier, it is preferred to use at least one silicon compound selected from the group consisting of a chlorosilane, an alkoxysilane, a hydrosilane, a silylamine, a silane coupling agent and a polyorganosiloxane.

The above-mentioned chlorosilane is a silicon compound containing 1 to 4 chlorine atoms in the molecule thereof. Examples of chlorosilanes include a $C_1$–$C_{12}$ alkyltrichlorosilane, methyldichlorosilane, dimethyldichlorosilane, trimethylchlorosilane, phenyltrichlorosilane, diphenylchlorosilane, trifluoropropyltrichlorosilane and heptadecafluorodecyltrichlorosilane. Of these, dimethyldichlorosilane, octyltrichlorosilane and trimethylchlorosilane are preferred.

The above-mentioned alkoxysilane is a silicon compound containing 1 to 4 methoxy groups or ethoxy groups in the molecule thereof. Examples of alkoxysilanes include tetramethoxysilane, a $C_2$–$C_{12}$ alkyltrimethoxysilane, dimethylmethoxysilane, phenyltrimethoxysilane, diphenyldimethoxysilane, tetraethoxysilane, methyltriethoxysilane, dimethyldiethoxysilane, phenyltriethoxysilane, diphenyldiethoxysilane, hexyltriethoxysilane, trifluoropropyltrimethoxysilane and heptadecatrifluorodecyltrimethoxysilane. Of these, methyltrimethoxysilane, octyltrimethoxysilane, decyltrimethoxysilane and dimethyldimethoxysilane are preferred.

The above-mentioned hydrosilane is a silicon compound containing 1 to 4 Si—H bonds in the molecule thereof. Examples of hydrosilanes include a $C_1$–$C_{12}$ alkylsilane, a di($C_1$–$C_{12}$ alkyl)silane and a tri($C_1$–$C_{12}$ alkyl)silane. Of these, octylsilane is preferred.

The above-mentioned silylamine is a silicon compound containing a silylamine structure represented by the following formula: ≡Si—N≡. Examples of silylamines include hexamethyldisilazane, hexaphenyldisilazane, trimethylsilyldimethylamine, trimethylsilyldiethylamine and trimethylsilylimidazole. Of these, hexamethyldisilazane is preferred.

The above-mentioned silane coupling agent is a compound which has a structure represented by the following formula:

$$RSiY_nX_m$$

wherein R represents a organic substituent having a functional group (e.g., a vinyl group, a glycido group, a methacryl group or a mercapto group) which can be bonded to an organic material, X represents a hydrolyzable group, such as a chlorine atom or an alkoxy group having 1 to 4 carbon atoms, which can be bonded to an inorganic material, Y represents an alkyl group having 1 to 4 carbon atoms, m is an integer of 1 to 3, and n is an integer of 0 to 2, with the proviso that m+n=3, and which has a function to bind an organic material and an inorganic material to each other at an interface therebetween.

Examples of silane coupling agents include vinyltrichlorosilane, vinyltrimethoxysilane, vinyltriethoxysilane, β-3,4-epoxycyclohexylethyltrimethoxysilane, γ-glycidoxypropyltrimethoxysilane, γ-glycidoxypropylmethyldiethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, N-β-aminoethyl-γ-aminopropylmethyldimethoxysilane, N-β-aminoethyl-γ-aminopropyltrimethoxysilane, N-β-aminoethyl-γ-aminopropyltriethoxysilane, γ-aminopropyltrimethoxysilane, γ-aminopropyltriethoxysilane, N-phenyl-γ-aminopropyltrimethoxysilane, γ-chloropropyltrimethoxysilane and γ-mercaptopropyltrimethoxysilane. Of these, preferred are β-3,4-epoxycyclohexylethyltrimethoxysilane, γ-glycidoxypropyltrimethoxysilane, γ-glycidoxypropylmethyldiethoxysilane and γ-glycidoxypropyltriethoxysilane.

The above-mentioned polyorganosiloxane is a polymer of a silicon compound which may be in the form of an oil, a rubber or a resin. As the polyorganosiloxane, especially preferred are a silicone oil and a modified silicone oil, which have a viscosity of from 2 to 1,000 cSt (measured at 25° C.).

Examples of silicone oils include a dimethyl silicone oil, a methyl phenyl silicone oil and a methyl hydrogen silicone oil. Of these, a dimethyl silicone oil and a methyl phenyl silicone oil are especially preferred.

Examples of modified silicone oils include a reactive silicone oil having in a molecule thereof at least one reactive substituent selected from the group consisting of an amino group, an epoxy group, a carboxyl group, a hydroxyl group, a methacryl group, a mercapto group and a phenol group; and a non-reactive silicone oil having in a molecule thereof at least one non-reactive substituent selected from the group consisting of a polyether group, a methylstyryl group, an alkyl group, a higher fatty acid ester group having 8 to 30 carbon atoms, an alkoxy group having 1 to 30 carbon atoms, a higher fatty acid group having 8 to 30 carbon atoms and a fluorine atom. Of these, preferred are a reactive silicone oil having a hydroxyl group, a reactive silicone oil having an epoxy group and a non-reactive silicone oil having a polyether group.

In the present invention, the treatment for surface modification of component (B) can be performed, for example, by a method described in Unexamined Japanese Patent Application Laid-Open Specification Nos. Hei 9-310027, Hei 9-59533 (corresponding to U.S. Pat. No. 5,843,525) and Hei 6-87609. Specifically, the treatment for surface modification of component (B) can be performed by a method comprising placing metal oxide particles in a container equipped with a stirrer, such as a Henschel mixer, and adding the above-mentioned silicon compound as a modifier while stirring, so as to cause the silicon compound as a modifier (preferably in the form of a gas or a mist) to contact with the metal oxide particles, thereby uniformly mixing together the metal oxide particles and the silicon compound as a modifier, while performing a reaction at a high temperature.

In the above-mentioned treatment for surface modification of component (B), the amount of the silicon compound as a modifier is preferably from 0.01 to 20% by weight, more preferably from 0.05 to 10% by weight, still more preferably from 1 to 8% by weight, based on the weight of component (B).

In the present invention, it is especially preferred to use, as component (B), a fumed silica which is surface-modified with a silicon compound.

The fumed silica is composed of agglomerates of spherical primary particles of amorphous silica, in which the primary particles are bonded together to form branched chains. In the agglomerates, the agglomeration of the primary particles is caused by a hydrogen bond or the van der Waals force, so that the disintegration of the agglomerates occurs during the melt-kneading thereof with a resin; however, the disintegration of the agglomerates into primary particles seldom occurs. Therefore, in the resin composition of the present invention, the fumed silica is observed as the above-mentioned aggregates. Further, the particle diameter distribution of the agglomerates present in the resin composition is relatively narrow.

Further, on the surface of the fumed silica particles, 3 to 4 silanol groups are present per $nm^2$ of the surface of the fumed silica particles. The surface modification of the fumed silica particles can be effectively performed by bonding the silicon compound through the silanol groups present on the surface of the fumed silica particles. The fumed silica particles having their surfaces modified with a silicon compound are especially preferred because such fumed silica particles have hydrophobic surfaces so that the fumed silica particles can be easily dispersed in a resin composition and the particle diameter distribution of the fumed silica particles becomes narrow.

Further, the use of the fumed silica particles produced by the dry method is preferred for the following reason. The primary particles of the fumed silica produced by the dry method are not porous, but are dense spherical particles, so that the fumed silica has a low water absorption. Therefore, the fumed silica particles are unlikely to cause any unfavorable phenomena (such as hydrolysis of a resin) in the resin composition, and the use of such fumed silica particles is especially advantageous in that the fumed silica particles are very unlikely to affect adversely the resin composition during the production thereof by the melt-kneading or during the molding of the resin composition.

The porosity of the fume silica can be evaluated in terms of the "pore volume" measured by a nitrogen adsorption method or a mercury intrusion porosimetry. In the present invention, it is especially preferred to use an amorphous fumed silica having a pore volume of 0.3 ml/g or less.

In addition, the water content of the amorphous fumed silica is preferably 5% or less, more preferably 3% or less, still more preferably 1% or less, still more preferably 0.5% or less, most preferably 0.3% or less.

Specific examples of component (B) which can be preferably used in the present invention include "Aerosil RY200", "Aerosil RX200", "Aerosil R805", "Aerosil R202", "Aerosil R974" and "Aerosil 200" (each manufactured and sold by Nippon Aerosil Co., Ltd., Japan).

Component (B) is used in an amount of from 0.01 to 0.5 part by weight, preferably from 0.05 to 0.45 part by weight, more preferably from 0.08 to 0.4 part by weight, still more preferably from 0.1 to 0.35 part by weight, most preferably from 0.15 to 0.3 part by weight, relative to 100 parts by weight of component (A). When component (B) is used in an amount of less than 0.01 part by weight, the flame retardancy of the resin composition cannot be satisfactorily improved. On the other hand, when component (B) is used in an amount of more than 0.5 part by weight, the melt stability and mechanical properties of the resin composition and the appearance of a molded article produced from the resin composition are likely to be spoiled.

The aromatic polycarbonate resin composition of the present invention has a structure in which branched metal oxide particles are randomly dispersed in a mixture of the aromatic polycarbonate (A), the alkali metal salt (C) of an organic sulfonic acid and the fluoropolymer (D). With respect to the resin composition of the present invention which has such a specific structure, during the burning of a molded article of the resin composition, it is surprisingly observed that component (B) is concentrated at the surface of the molded article of the resin composition to thereby form a surface layer comprised of component (B).

The concentrating of component (B) at the surface of a molded article of the resin composition of the present invention (i.e., formation of the surface layer comprised of component (B)) during the burning of the molded article can be confirmed, for example, by the following method. In accordance with Underwriters Laboratories Subject 94 (hereinafter, referred to as "UL-Subject 94"), a test specimen (having a thickness of 5 mm or less) for tests for flammability is prepared, and subjected to the 20 MM Vertical Burning Test. Then, an uncarbonized, smooth portion of the surface of the test specimen, which portion is positioned within a distance of 3 cm from the edge of the portion contacted with fire, is observed under a scanning probe microscope (SPM), to thereby confirm the formation of the surface layer comprised of component (B).

For obtaining a resin composition having especially high flame retardancy, it is preferred that the resin composition has a surface layer comprised of component (B) such that the total area of the metal oxide particles as component (B) is 30% or more, more advantageously 50% or more, still more advantageously 70% or more, as measured with respect to a predetermined 1 μm×1 μm area of an image obtained in the above-mentioned observation under SPM, wherein component (B) is dispersed throughout the predetermined area.

With respect to the aromatic polycarbonate resin composition of the present invention, the above-mentioned formation of the surface layer comprised of component (B) during the burning of a molded article produced from the resin composition of the present invention is considered as one of the reasons why the resin composition exhibits excellent flame retardancy in the form of a very thin molded article. More specifically, it is considered that the surface layer comprised of component (B) formed during the burning of the molded article not only functions as a heat insulation layer but also suppresses the diffusion of a burning gas into the surface of the molded article.

With respect to such phenomenon that component (B) randomly dispersed in the resin composition of the present invention is concentrated at the surface of the molded article to form a surface layer comprised of component (B), the reasons therefor have not yet been elucidated, but are considered as follows.

1) During the burning of the molded article, branched metal oxide particles (B) present on the surface of the molded article are reaggregated through highly reactive hydroxyl groups present on the surface of component (B) by the radiant heat from the flame, thereby forming a surface layer comprised of branched metal oxide particles (B).
2) By virtue of the branched structure, branched metal oxide particles (B) can form a dense surface layer during the burning of the molded article.
3) The average particle diameter of branched metal oxide particles (B) is on the order of a nanometer and, hence, the branched metal oxide particles (B) have a great mobility in a molten resin composition.
4) Further, when the surfaces of the branched metal oxide particles (B) are coated with a hydrophobic modifier, the surface energy of component (B) is small so that the metal oxide particles/air interfacial interaction becomes greater than the metal oxide particles/resin interfacial interaction. Thus, the above-mentioned interfacial interactions are in a balance which brings the metal oxide particles into contact with air.

Next, an explanation is given below with respect to component (C) used in the resin composition of the present invention.

Component (C) is an alkali metal salt of an organic sulfonic acid. Examples of component (C) include alkali metal salts of aliphatic sulfonic acids and alkali metal salts of aromatic sulfonic acids.

Examples of alkali metals include lithium, sodium, potassium, rubidium and cesium. Of these, lithium, sodium and potassium are preferred, and potassium is most preferred.

Preferred examples of alkali metal salts of aliphatic sulfonic acids include alkali metal salts of $C_1$–$C_8$ alkanesulfonic acids; alkali metal salts of $C_1$–$C_8$ alkanesulfonic acids, wherein each alkyl group thereof is partially fluorinated; and alkali metal salts of $C_1$–$C_8$ perfluoroalkanesulfonic acids. Specific examples of these alkali metal salts of aliphatic sulfonic acids include sodium perfluoroethanesulfonate and potassium perfluorobutanesulfonate.

Examples of alkali metal salts of aromatic sulfonic acids include alkali metal salts of aromatic sulfonic acids selected from the group consisting of sulfonic acids of monomeric or polymeric aromatic sulfides, sulfonic acids of aromatic carboxylic acids or esters thereof, sulfonic acids of monomeric or polymeric aromatic ethers, sulfonic acids of aromatic sulfonates, monomeric or polymeric aromatic sulfonic acids, sulfonic acids of monomeric or polymeric aromatic sulfones, sulfonic acids of aromatic ketones, heterocyclic sulfonic acids, sulfonic acids of aromatic sulfoxides, and condensation products of aromatic sulfonic acids in which the aromatic sulfonic acid monomers are bonded through methylene linkages.

Preferred examples of the above-mentioned alkali metal salts of sulfonic acids of monomeric or polymeric aromatic sulfides include disodium diphenylsulfide-4,4'-disulfonate and dipotassium diphenylsulfide-4,4'-disulfonate.

Preferred examples of the above-mentioned alkali metal salts of sulfonic acids of aromatic carboxylic acids or esters thereof include potassium 5-sulfoisophthalate, sodium 5-sulfoisophthalate and polysodium polyethyleneterephthalate polysulfonate.

Preferred examples of the above-mentioned alkali metal salts of sulfonic acids of monomeric or polymeric aromatic ethers include disodium 4-dodecylphenyletherdisulphonate, polysodium poly(2,6-dimethylphenyleneoxide)polysulfonate, polysodium poly(1,3-phenyleneoxide)polysulfonate, polysodium poly(1,4-phenyleneoxide)polysulfonate, polypotassium poly(2,6-diphenylphenyleneoxide)polysulfonate and lithium poly(2-fluoro-6-butylphenyleneoxide)polysulfonate.

Preferred examples of the above-mentioned alkali metal salts of sulfonic acids of aromatic sulfonates include potassium salts of benzenesulfonate sulfonic acid.

Preferred examples of the above-mentioned alkali metal salts of monomeric or polymeric aromatic sulfonic acids include sodium benzenesulfonate, dipotassium p-benzenedisulfonate and dipotassium naphthalene-2,6-disulfonate.

Preferred examples of the above-mentioned alkali metal salts of sulfonic acids of monomeric or polymeric aromatic sulfones include sodium diphenylsulfone-3-sulufonate, potassium diphenylsulfone-3-sulfonate, dipotassium diphenylsulfone-3,3'-disulfonate and dipotassium diphenylsulfone-3,4'-disulfonate.

Preferred examples of the above-mentioned alkali metal salts of sulfonic acids of aromatic ketones include sodium α,α,α-trifluoroacetophenone-4-sulfonate and dipotassium benzophenone-3,3'-disulfonate.

Preferred examples of the above-mentioned alkali metal salts of heterocyclic sulfonic acids include disodium thiophene-2,5-disulfonate, dipotassium thiophene-2,5-disulfonate and sodium benzothiophenesulfonate.

Preferred examples of the above-mentioned alkali metal salts of sulfonic acids of aromatic sulfoxides include potassium diphenylsulfoxide-4-sulfonate.

Preferred examples of the above-mentioned condensation products of alkali metal salts of aromatic sulfonic acids include a condensation product of sodium naphthalene sulfonate with folmalin and a condensation product of sodium anthracenesulfonate with folmalin.

Component (C) promotes the decarboxylation of component (A) (aromatic polycarbonate) during the burning of the aromatic polycarbonate resin composition of the present invention. Thus, component (C) functions as a flame retardant. In the present invention, the combined use of components (B) and (C) has a synergistic effect of suppressing the burning of the resin composition. Therefore, even when component (C) is used in a very small amount, the aromatic polycarbonate resin composition of the present invention exhibits an excellent flame retardancy.

By using components (B) and (c) in combination, the decarboxylation proceeds mildly and uniformly as compared to the case where only component (C) is used as a flame retardant. By an observation under an optical microscope equipped with a heating stage, it can be confirmed that the decarboxylation of component (A) gradually proceeds in accordance with the elevation of temperature and uniformly proceeds throughout the resin composition.

In the aromatic polycarbonate resin composition of the present invention, since an excellent flame retardancy can be obtained even when component (C) is used in a small amount, not only can the excellent heat resistance and impact resistance which an aromatic polycarbonate inherently possesses be maintained, but also the resin composition has a melt stability which is comparable to that of an aromatic polycarbonate which is a base resin component of the resin composition.

In the present invention, component (C) is used in an amount of from 0.0001 to 0.2 part by weight, preferably from 0.001 to 0.18 part by weight, more preferably from 0.005 to 0.15 part by weight, most preferably from 0.01 to 0.1 part by weight, relative to 100 parts by weight of component (A). When component (C) is used in an amount of less than 0.0001 part by weight, the flame retardancy of a thin molded article obtained from the resin composition becomes unsatisfactory. On the other hand, when component (C) is used in an amount of more than 0.2 part by weight, the melt stability of the resin composition becomes unsatisfactory.

Next, an explanation is given below with respect to component (D) used in the present invention.

Component (D) used in the present invention is a fluoropolymer. Examples of component (D) include tetrafluoroethylene polymers, such as polytetrafluoroethylene and a tetrafluoroethylene/propylene copolymer, and perfluoroalkane polymers other than polytetrafluoroethylene. Of these, tetrafluoroethylene polymers are preferred, and polytetrafluoroethylene is most preferred.

In the present invention, it is preferred that component (D) is a fluoropolymer having a fibril-forming ability. Further, the fluoropolymer used in the present invention may be in any of various different forms, such as a fine powder, an aqueous dispersion, a powder mixture with an acrylonitrile/styrene copolymer (AS resin), and a powder mixture with polymethylmethacrylate (PMMA).

In the present invention, it is especially preferred to use a powder mixture of a fluoropolymer with an AS resin or PMMA. With respect to a powder mixture of a fluoropolymer with a thermoplastic resin, such as an AS resin or PMMA, reference can be made to Unexamined Japanese Patent Application Laid-Open Specification Nos. Hei 9-95583 (corresponding to U.S. Pat. No. 5,804,654), Hei 11-49912 (corresponding to U.S. Pat. No. 6,040,370), 2000-143966 and 2000-297189. Specific examples of such powder mixtures include Blendex™ 449 (manufactured and sold by GE Speciality Chemicals, U.S.A.) and Metablen™ A-3800 (manufactured and sold by Mitsubishi Rayon Co., Ltd., Japan).

In the present invention, component (D) is used in an amount of from 0.01 to 0.5 part by weight, preferably from 0.03 to 0.4 part by weight, more preferably from 0.05 to 0.35 part by weight, still more preferably from 0.08 to 0.3 part by weight, relative to 100 parts by weight of component (A).

When component (D) is used in an amount of less than 0.01 part by weight, the dripping of flaming particles cannot be satisfactorily prevented when a thin molded article obtained from the resin composition is on fire. On the other hand, when component (D) is used in an amount of more than 0.5 part by weight, the appearance of a molded article obtained from the resin composition is likely to be spoiled, for example, by the occurrence of a silver streak.

The aromatic polycarbonate resin composition of the present invention may further contain an additive (E) which is at least one additive selected from the group consisting of a reinforcing agent and a filler. Component (E) is used for imparting desired properties, such as stiffness, dimensional stability and mechanical strength, to the resin composition.

Examples of component (E) which can be used in the present invention include a glass fiber, a carbon fiber, an alumina fiber, a zirconia fiber, a boron nitride fiber, a silicon carbide fiber, an aramid fiber, a liquid crystalline polyester, talc, mica, clay, wollastonite, montmorillonite, kaolin, sepiolite, a glass flake, glass beads, a glass balloon, a milled glass, a silica glass, silica, potassium titanate, silicon carbide, calcium carbonate, magnesium carbonate, graphite, calcium sulfate and barium sulfate. These substances can be used individually or in combination.

Of these, as component (E), it is preferred to use at least one additive selected from the group consisting of a glass fiber, a carbon fiber, talc, mica, wollastonite, a glass flake, glass beads, a glass balloon, a silica glass and silica, and it is most preferred to use at least one additive selected from the group consisting of a glass fiber, a carbon fiber, a glass flake, glass beads, a glass balloon, a silica glass and silica.

Further, the pH value of component (E) is in the range of from 6 to 10, preferably from 6.5 to 9.5. When the pH value is outside the above-mentioned range, the melt stability of the resin composition is likely to be lowered. The pH value of component (E) can be measured in accordance with JIS K5101.

As component (E) used in the present invention, it is most preferred to use an additive which is surface-modified with any of the silane coupling agents mentioned above in connection with component (B). Further, component (E) may be used in combination with any of various compounds as a bundling agent, such as an epoxy compound, a urethane compound and an acrylic compound. By the use of a surface-modified component (E), not only can the decomposition of component (A) be prevented, but also an adhesion of component (E) to a resin can be improved, so that it becomes possible to impart various desired properties, such as stiffness, dimensional stability and mechanical strength, to the resin composition.

In the resin composition of the present invention, when at least one additive selected from the group consisting of a glass fiber, a carbon fiber, a glass flake, glass beads, a glass balloon, silica glass and silica is used as component (E), it is especially preferred that component (E) is surface-modified with an aminosilane type coupling agent and such surface-modified component (E) is used in combination with a urethane type bundling agent.

Further, for improving the dimensional stability of a molded article obtained from the resin composition of the present invention, it is preferred to use, as component (E), a glass flake or a combination of a glass flake with a glass fiber.

In the present invention, component (E) is used in an amount of from 1 to 200 parts by weight, preferably from 3 to 100 parts by weight, more preferably from 5 to 50 parts by weight, relative to 100 parts by weight of component (A).

In the present invention, by using component (E), the stiffness of the aromatic polycarbonate resin composition can be improved. The stiffness of the resin composition can be evaluated in terms of a flexural modulus of the resin composition. In the present invention, the flexural modulus of the resin composition as measured in accordance with ISO-178 is preferably from 3,000 to 12,000 MPa, more preferably from 3,500 to 10,000 MPa, most preferably from 4,000 to 8,000 MPa.

For improving the melt fluidity or mechanical properties (such as impact resistance) of the aromatic polycarbonate resin composition of the present invention, the resin composition may further contain a thermoplastic resin other than an aromatic polycarbonate in an amount up to 5 parts by weight, preferably up to 3 parts by weight, relative to 100 parts by weight of component (A).

Examples of thermoplastic resins other than an aromatic polycarbonate include a polystyrene resin, a polyphenylene ether resin, a polyolefin resin, a polyvinyl chloride resin, a polyamide resin, a polyester resin, a polyphenylenesulfide, a polymethacrylate resin and a rubber-modified polymer. These resins can be used individually or in combination.

Of the above-mentioned resins, it is preferred to use a polystyrene resin and/or a rubber-modified polymer. As especially preferred examples of such resins, there can be mentioned an acrylonitrile/styrene copolymer resin (AS resin) and a polystyrene resin (PS). Especially preferred examples of rubber-modified polymers include an acrylonitrile/butadiene/styrene copolymer (ABS resin), a methyl methacrylate/butadiene/styrene copolymer (MBS resin), a methyl methacrylate/butadiene copolymer (MB resin), a methyl methacrylate/butyl acrylate copolymer (MBA resin), a methyl methacrylate/butyl acrylate/styrene copolymer (MBAS resin), an acrylontrile/butyl acrylate/styrene copolymer (AAS resin), and a high impact polystyrene (HIPS).

The aromatic polycarbonate resin composition of the present invention may further contain an additive, such as a coloring agent, a dispersant, a thermal stabilizer, a light stabilizer, a lubricant, a mold release agent and an antistatic agent. The amount of the additive(s) used is generally up to 5 parts by weight, relative to 100 parts by weight of component (A).

Hereinbelow, an explanation is given with respect to a method for producing the aromatic polycarbonate resin composition of the present invention.

The aromatic polycarbonate resin composition of the present invention can be produced by subjecting components (A), (B), (C), (D) and optionally component (E) and/or the above-mentioned other components to melt-kneading using a melt-kneading apparatus, such as a Banbury mixer, a kneader, a single-screw extruder or a twin-screw extruder. For continuously producing the resin composition of the present invention by uniformly mixing the above-mentioned components, a twin-screw extruder is most suitable.

A most preferred production method is a melt-kneading method using a twin-screw extruder having an L/D ratio (i.e., ratio of the length (L) of the extruder in an extrusion direction to the diameter (D) of a screw of the extruder) of from 5 to 100, preferably from 10 to 70, more preferably from 20 to 50.

The production of the resin composition of the present invention may be performed by a method in which the above-mentioned components are premixed in a premixing apparatus, such as a tumbler or a ribbon blender, and the resultant mixture is subjected to melt-kneading using an extruder to thereby produce the resin composition of the present invention. When component (E) is used, it is preferred to feed component (E) from a side feeder of the extruder, separately from the other components.

When an extruder is used in the production of the resin composition of the present invention, the melt-kneading may be performed under conditions wherein the cylinder temperature of the extruder is in the range of from 200 to 400° C., preferably from 220 to 350° C., more preferably from 230 to 300° C., the revolution rate of the screw is in the range of from 50 to 700 rpm, preferably from 80 to 500 rpm, more preferably from 100 to 300 rpm, and the average residence time of a molten resin mixture in the extruder is in the range of from 10 to 150 seconds, preferably from 20 to 100 seconds, more preferably 30 to 60 seconds. During the melt-kneading, the temperature of the molten resin composition in the extruder is preferably maintained within the range of from 250 to 330° C., so as to prevent the resin from being excessively heated during the melt-kneading. The resultant resin composition obtained by the melt-kneading is extruded in the form of a strand from a die provided at an end portion of the extruder and, then, pelletized to thereby obtain the resin composition in the form of pellets.

With respect to the method for producing the resin composition of the present invention, it is preferred that a devolatilization is performed simultaneously with the melt-kneading. The "devolatilization" means the removal of volatile matters generated during the melt-kneading through a vent of an extruder under atmospheric pressure or reduced pressure.

When the above-mentioned devolatilization is performed under reduced pressure, the pressure is preferably from 1 to $5 \times 10^4$ Pa, more preferably from 10 to $4 \times 10^4$ Pa, still more preferably from 100 to $2 \times 10^4$ Pa.

The aromatic polycarbonate resin composition of the present invention can be molded by any of the conventional molding methods, such as injection molding, gas-assisted injection molding, extrusion molding, blow molding and compression molding, to thereby obtain various molded articles. It is especially preferred to mold the resin composition of the present invention by injection molding or gas-assisted injection.

Examples of molded articles which can be produced by molding the aromatic polycarbonate resin composition of the present invention include housings and structural parts of various devices, such as computer-related devices (such as a computer monitor, a mouse, and a keyboard), a notebook computer, a copying machine, a fax machine, a printer, a projector, a portable device, an electric or electronic device, and a precision machine.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, aromatic polycarbonate resin compositions were produced using the following components (A), (B), (C), (D) and (E), and other components.

1. Component (A): Aromatic Polycarbonate

The following substances (PC-1) and (PC-2) are used as component (A).

(PC-1): A bisphenol A polycarbonate produced by a melt transesterification process, comprising recurring units represented by formula (9) above and heterounits represented by formula (10) above, and having the following properties.
Weight average molecular weight (Mw)=21,600
Terminal phenolic group ratio=24%
Heterounit content=0.08 mol %

The terminal phenolic group ratio was measured by nuclear magnetic resonance (NMR) spectroscopy.

The heterounit content was determined as follows. 55 mg of an aromatic polycarbonate resin was dissolved in 2 ml of tetrahydrofuran. To the resultant solution, 0.5 ml of a 5 N solution of potassium hydroxide in methanol was added, and the resultant mixture was stirred at room temperature for 2 hours to hydrolyze the aromatic polycarbonate resin completely. The resultant reaction mixture was mixed with 0.3 ml of concentrated hydrochloric acid, and the resultant mixture was subjected to reversed phase liquid chromatography. The reversed phase liquid chromatography was performed by means of a 991L UV detector (manufactured and sold by Waters Corporation, U.S.A.) and Inertsil ODS-3 column (manufactured and sold by GL Science Inc., Japan). A mixture of methanol and a 0.1 weight % aqueous solution of phosphoric acid was used as an eluent, and measurement was carried out at a column temperature of 25° C. by gradient elution technique at a gradient wherein the volume ratio (methanol/0.1 weight % aqueous solution of phosphoric acid) is changed from 20/80 at the start to 100/0. The absorbance at 300 nm was measured using the UV detector. Absorbance coefficient for determining the heterounit content was obtained by using a standard compound. As a standard compound, a hydroxy compound having a structure formed by hydrolysis of the heterounit represented by formula (10) above was used. The heterounit content was defined as the mole % of the heterounit, based on the recurring units represented by formula (9) above.

(PC-2): A bisphenol A polycarbonate produced by phosgene process, having the following properties.
Weight average molecular weight (Mw)=21,500
Terminal phenolic group ratio=2%
Heterounit content: no heterounit was detected 2. Component (B): Branched Metal Oxide Particles The following substances (oxide particles 1), (oxide particles 2) and (oxide particles 3) are used as component (B).

(Oxide particles 1): Modified, branched silicon oxide particles (trade name: Aerosil RY200; manufactured and sold by Nippon Aerosil Co., Ltd., Japan) obtained by subjecting a fumed silica (produced by the dry method) to surface treatment with a polydimethylsiloxane.

(Oxide particles 2): Branched silicon oxide particles (fumed silica which has not been subjected to surface treatment) (trade name: Aerosil 200; manufactured and sold by Nippon Aerosil Co., Ltd., Japan) produced by the dry method.

(Oxide particles 3): Modified, branched titanium oxide particles (trade name: Aerosil T805; manufactured and sold by Nippon Aerosil Co., Ltd., Japan) obtained by subjecting titanium oxide particles (produced by the dry method) to surface treatment with octylsilane.

3. Component (C): Alkali Metal Salt of an Organic Sulfomic Acid.

The following substance ($C_4F_9SO_3K$) is used as component (C).

($C_4F_9SO_3K$): Potassium perfluorobutanesulfonate (trade name: MEGAFACE F-114; manufactured and sold by DAINIPPON INK & CHEMICALS INC., Japan).

4. Component (D): Fluoropolymer

The following substance (PTFE/AS) is used as component (D).

(PTFE/AS): A powder mixture (trade name: Blendex 449; manufactured and sold by GE Speciality Chemicals Inc., U.S.A.) of polytetrafluoroethylene (PTFE) and an acrylonitrile/styrene copolymer (AS resin), which mixture has a PTFE/AS resin weight ratio of 50/50.

5. Component (E): Additive (Reinforcing Agent and/or Filler)

The following substance (GF) was used as component (E).

(GF): Chopped strands (trade name: T-571; manufactured and sold by Nippon Electric Glass Co., Ltd., Japan).

6. Other Components (I-1076) (hindered phenol type antioxidant): Octadecyl-3-(3,5-di-t-butyl-4-hydroxyphenyl)propionate (trade name: Irganox 1076; manufactured and sold by Ciba Speciality Chemicals, Japan).

(P-168) (phosphate type heat stabilizer): tris(2,4-di-t-butylphenyl)phosphite (trade name: IRGA-FOS 168; manufactured and sold by Ciba Speciality Chemicals, Japan).

(Mold release agent): Pentaerythritol tetrastearate (trade name: Unister H476; manufactured and sold by NOF Corporation, Japan).

EXAMPLE 1

An aromatic polycarbonate resin composition was produced in accordance with the formulation shown in Table 1. Specifically, the production of the aromatic polycarbonate resin composition was performed as follows.

A melt-kneading of the raw materials was performed by means of a twin-screw extruder (trade name: PCM-30; manufactured and sold by Ikegai Corporation, Japan) (L/D=28) under conditions wherein the cylinder temperature was 270° C., the screw revolution rate was 150 rpm, and the extrusion rate of the resultant resin composition was 15 kg/hr. During the melt-kneading, the temperature of the molten resin composition in the extruder was measured by means of a thermocouple which was provided at the die of the extruder. As a result, it was found that the resin temperature was 290° C.

With respect to the feeding of the components to the twin-screw extruder, each of the components indicated in Table 1 were preblended together for 20 minutes using a tumbler, and the resultant mixture was introduced into the extruder by means of a gravimetric feeder. Further, during the melt-kneading, a devolatilization was performed through a vent provided at a downstream portion of the extruder under reduced pressure, namely under a pressure of $2 \times 10^4$ Pa. After the melt-kneading, the resultant resin composition was extruded in the form of a strand, and the obtained strand was pelletized, thereby obtaining an aromatic polycarbonate resin composition in the form of pellets.

The obtained pellets were dried at 120° C. for 5 hours. With respect to the dried pellets, various properties of the resin composition were evaluated. Specifically, various tests were performed as follows.

(1) Average Particle Diameter and Particle Diameter Distribution of Metal Oxide Particles (B)

An ultrathin specimen was cut out from the dried pellet. Then, a photomicrograph of the obtained specimen was taken using a transmission electron microscope (TEM) (manufactured and sold by JEOL, LTD., Japan). Then, from the metal oxide particles on the photomicrograph, 100 particles were chosen, and the diameters of the 100 particles were determined. From the determined particle diameters, the average particle diameter of metal oxide particles (B) and the percentage of metal oxide particles which have particle diameters in the range of from 10 to 200 nm were determined, respectively.

Each of the above-mentioned particle diameters was determined by a method in which an area S of a particle on the photomicorgraph is measured, and the particle diameter of the particle is calculated by the formula: $(4S/\pi)^{0.5}$.

(2) Flame Retardancy

The dried pellets were subjected to an injection molding using an injection molding machine (trade name: Autoshot 50D; manufactured and sold by FANUC LTD., Japan) at a cylinder temperature of 290° C. and a mold temperature of 80° C., to thereby obtain strip specimens having different thicknesses (1.50 mm, 1.20 mm, 1.00 mm and 0.80 mm). The strip specimens were maintained at 23° C. under a humidity of 50% for two days. With respect to the resultant strip specimens, the flame retardancy thereof was evaluated by the 50 W (20 mm) Vertical Burning Test described in UL-subject 94. More specifically, the tests for "V-0", "V-1" and "V-2" as prescribed in UL-subject 94 were performed, wherein the level of the flame retardancy is as follows: V-0>V-1>V-2.

Further, in each of Example 5 and Comparative Example 8, a strip specimen having a thickness of 2.00 mm was produced in the same manner as mentioned above and maintained under the same conditions as mentioned above. With respect to the resultant strip specimen, the flame retardancy thereof was evaluated by the 500 W (125 mm) Vertical Burning Test (5VB) described in UL-subject 94.

(3) Heat Distortion Temperature (HDT)

The dried pellets were subjected to an injection molding using an injection molding machine (trade name: Autoshot 50D; manufactured and sold by FANUC LTD., Japan) at a cylinder temperature of 290° C. and a mold temperature of 80° C., to thereby obtain a test specimen. With respect to the obtained test specimen, the heat distortion temperature (unit: ° C.) thereof was measured in accordance with ISO-75-1 under a load of 1.82 MPa.

(4) Impact Resistance

The dried pellets were subjected to an injection molding using an injection molding machine (trade name: Autoshot 50D; manufactured and sold by FANUC LTD., Japan) at a cylinder temperature of 290° C. and a mold temperature of 80° C., to thereby obtain a notched specimen having a thickness of ⅛ inch. With respect to the obtained specimen, the impact strength (unit: J/m) thereof was measured in accordance with ASTM D256.

(5) Flexural Modulus

The dried pellets were subjected to an injection molding using an injection molding machine (trade name: Autoshot 50D; manufactured and sold by FANUC LTD., Japan) at a cylinder temperature of 290° C. and a mold temperature of 80° C., to thereby obtain a test specimen. With respect to the obtained test specimen, the flexural modulus (unit: MPa) thereof was measured in accordance with ISO-178.

(6) Melt Stability

The dried pellets of a resin composition were retained in an injection molding machine (trade name: Autoshot 50D; manufactured and sold by FANUC LTD., Japan) at a cylinder temperature of 290° C. for 40 minutes. Then, from the resultant resin composition in a molten form was produced a notched strip specimen having a thickness of ⅛ inch. With respect to the produced strip specimen, the Izod impact strength (unit: J/m) thereof was measured in accordance with ASTM D256.

The melt stability was measured with respect to 5 specimens. Specifically, the melt stability was evaluated according to the number of specimens which had suffered brittle fracture by the melt stability test.

EXAMPLE 2

An aromatic polycarbonate resin composition was produced in substantially the same manner as in Example 1 except that oxide particles 2 were used instead of oxide particles 1. With respect to the obtained resin composition, various properties thereof were evaluated in the same manner as in Example 1. The results are shown in Table 1.

GmbH, Germany) was used instead of oxide particles 1. Sachtoperse is inorganic compound particles which do not have a branched structure and, hence, do not satisfy the requirement of component (B) usable in the present invention.

In Comparative Example 3, silica particles (trade name: Nipsil E-75; manufactured and sold by Nippon Silica Industrial Co., Ltd., Japan) were used instead of oxide particles 1. Nipsil E-75 does not have a branched structure and, hence, does not satisfy the requirement of component (B) usable in the present invention.

In Comparative Example 4, rutile (titanium oxide) particles were used instead of oxide particles 1. Rutile particles do not have a branched structure and, hence, do not satisfy the requirement of component (B) usable in the present invention.

The results are shown in Table 1.

TABLE 1

| | | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| Component (A) | PC-1 [part by weight] | 100 | 100 | 100 | 100 | 100 | 100 | 100 |
| Component (B) | Oxide particles 1 [part by weight] | 0.3 | 0 | 0 | 0 | 0 | 0 | 0 |
| | Oxide particles 2 [part by weight] | 0 | 0.3 | 0 | 0 | 0 | 0 | 0 |
| | Oxide particles 3 [part by weight] | 0 | 0 | 0.3 | 0 | 0 | 0 | 0 |
| Oxide, particles other than component (B) | $BaSO_4$ [part by weight] | 0 | 0 | 0 | 0 | 0.3 | 0 | 0 |
| | Silica particles [part by weight] | 0 | 0 | 0 | 0 | 0 | 0.3 | 0 |
| | $TiO_2$ particles [part by weight] | 0 | 0 | 0 | 0 | 0 | 0 | 0.3 |
| Component (C) | $C_4F_9SO_3K$ [part by weight] | 0.01 | 0.01 | 0.01 | 0 | 0.01 | 0.01 | 0.01 |
| Component (D) | PTFE/AS [part by weight] | 0.2 | 0.2 | 0.2 | 0 | 0.2 | 0.2 | 0.2 |
| Other components | I-1076 [part by weight] | 0.03 | 0.03 | 0.03 | 0.03 | 0.03 | 0.03 | 0.03 |
| | P-168 [part by weight] | 0.01 | 0.01 | 0.01 | 0.01 | 0.01 | 0.01 | 0.01 |
| Average particle diameter of oxide particles used [nm] | | 90 | 110 | 135 | — | 320 | 1,800 | 280 |
| Percentage of oxide particles which have a particle diameter in the range of 10–200 nm [%] | | 93 | 85 | 75 | — | <20 | <10 | <20 |
| Whether or not the oxide particles have a branched structure | | Yes | Yes | Yes | — | No | No | No |
| UL-94 flame retardancy | Sample thickness: 1.50 mm | V-0 | V-0 | V-0 | V-2 | V-2 | V-2 | V-2 |
| Heat distortion temperature [° C.] | | 127 | 126 | 126 | 126 | — | — | — |
| Impact resistance [J/m] | | 650 | 640 | 635 | 645 | — | — | — |
| Flexual modulus [MPa] | | 2,410 | 2,400 | 2,430 | 2,390 | — | — | — |
| Melt stability | Izod impact strength [J/m] | 635 | 610 | 590 | 640 | — | — | — |
| | Brittle fracture [number of fractured specimen(s) out of 5 specimens] | 0 | 0 | 0 | 0 | — | — | — |

Notes:
(1) "—" means that the measurement was not performed.
(2) The PTFE content of PTFE/AS (used as component (D)) was 50% by weight.

EXAMPLE 3

An aromatic polycarbonate resin composition was produced in substantially the same manner as in Example 1 except that oxide particles 3 were used instead of oxide particles 1. With respect to the obtained resin composition, various properties thereof were evaluated in the same manner as in Example 1. The results are shown in Table 1.

COMPARATIVE EXAMPLES 1 TO 4

In each of Comparative Examples 1 to 4, an aromatic polycarbonate resin composition was produced in substantially the same manner as in Example 1 in accordance with the formulation shown in Table 1. With respect to the obtained resin compositions, various properties thereof were evaluated in the same manner as in Example 1.

In Comparative Example 2, barium sulfate ($BaSO_4$) (trade name: Sachtoperse; manufactured and sold by Sachtleben

EXAMPLES 4 TO 6

In each of Examples 4 to 6, an aromatic polycarbonate resin composition was produced in substantially the same manner as in Example 1 in accordance with the formulation shown in Table 2. With respect to the obtained resin composition, various properties thereof were evaluated in the same manner as in Example 1. The results are shown in Table 2.

Further, an aromatic polycarbonate resin composition was produced in substantially the same manner as in Example 4, except that component (C) was changed to potassium perfluorobutane sulfonate (trade name: RM-65; manufactured and sold by MITENI S.p.A., Italy). With respect to the obtained resin composition, the flame retardancy thereof was measured, and the surface thereof after the flame retardancy test was observed to evaluate the state of dispersion of branched metal oxide particles on the surface. Specifically, the measurements were performed as follows.

The dried pellets of a resin composition were subjected to an injection molding using an injection molding machine (trade name: Autoshot 50D; manufactured and sold by FANUC LTD., Japan) at a cylinder temperature of 290° C. and a mold temperature of 80° C., to thereby obtain a strip specimen having a thickness of 1/16 inch. With respect to the obtained strip specimen, the flame retardancy thereof was evaluated by the 50 W (20 mm) Vertical Burning Test described in UL-subject 94. Then, the surface of the resultant strip specimen was observed to evaluate the state of dispersion of branched metal oxide particles. Specifically, using a burner as prescribed in UL-subject 94, the strip specimen was contacted with fire for 10 seconds in a manner as prescribed in UL-subject 94. The contact with fire for 10 seconds was repeated once more (i.e., the contact with fire for 10 seconds was performed two times in total). After the second contact with fire, the surface of the resultant strip specimen was observed to evaluate the state of dispersion of branched metal oxide particles on the surface of the specimen.

The observation of the surface of the strip specimen after the second contact with fire was performed by means of a scanning probe atomic force microscope (SPM) (trade name: 300 HV; manufactured and sold by Seiko Instruments Inc., Japan) with respect to an uncarbonized, smooth portion of the surface of the strip specimen, which portion is positioned within a distance of 3 cm from the edge of the portion contacted with fire. Specifically, the measurement was performed in DFM mode (one of the measurement modes of the above-mentioned SPM) using DF20 as the cantilever, and a surface phase contrast image (photomicrograph) was taken and observed.

Figure 2:
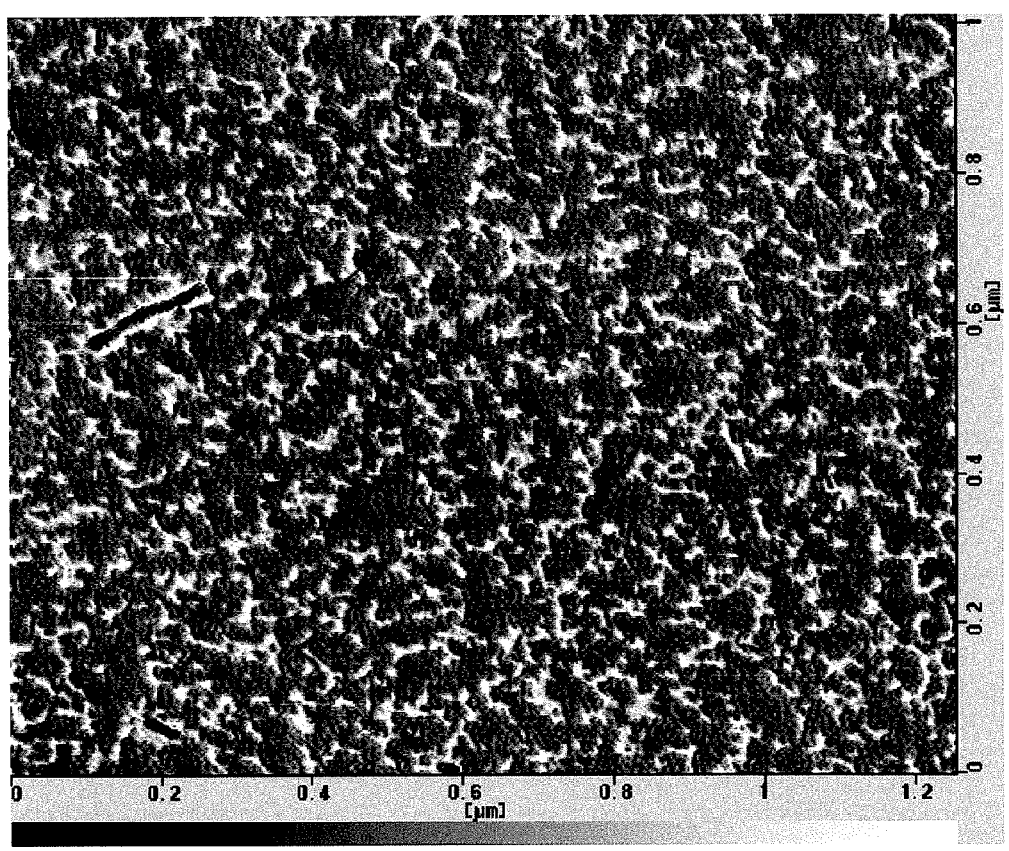
FIG. 2 is a photomicrograph (taken using a scanning probe microscope) of the surface of a 1/16 inch-thick test specimen which was produced by molding the same resin composition as that of FIG. 1, and which was subjected to the 20 mm Vertical Burning Test described in UL-Subject 94. In the 20 mm Vertical Burning Test, the test specimen was self-extinguished 6 seconds after the second contact (10 seconds) with fire, and the flame retardancy of the test specimen was "V-0".
Figure 3:
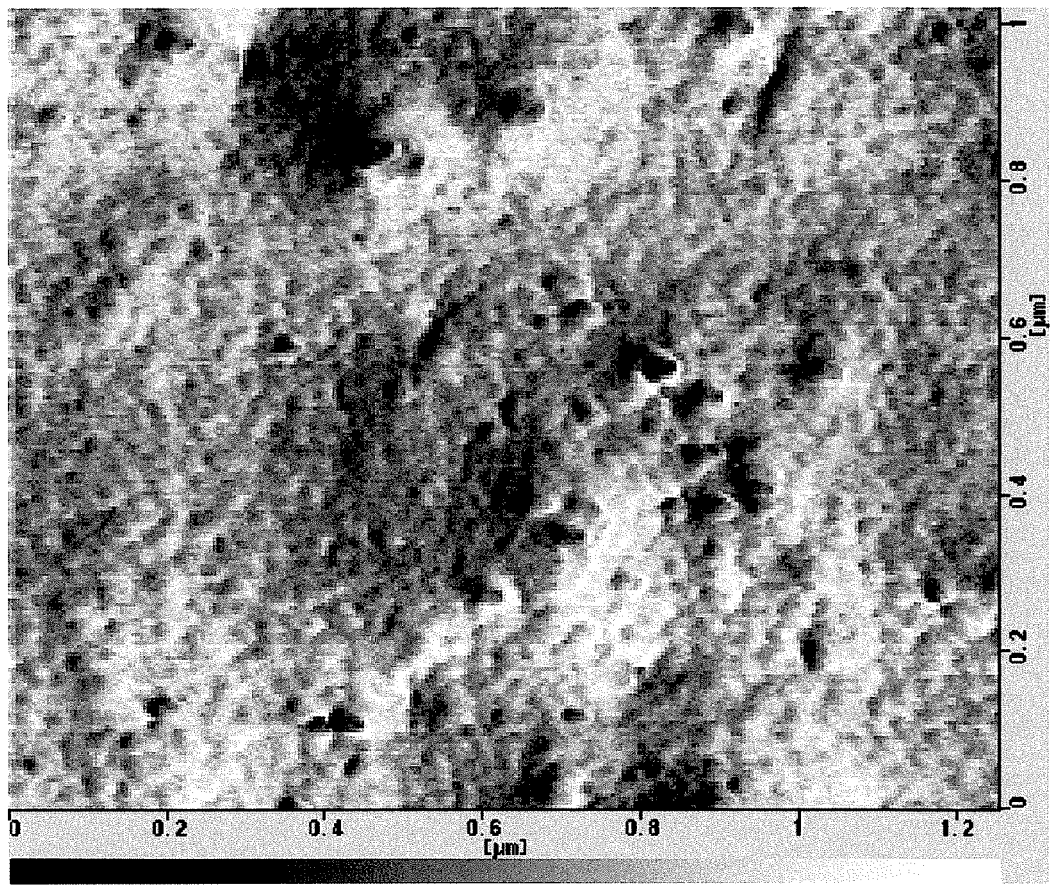
FIG. 3 is a photomicrograph (taken using a scanning probe microscope) of the surface of a 1/16 inch-thick test specimen which was produced by molding an aromatic polycarbonate resin composition obtained in Comparative Example 5, and which was subjected to the 20 mm Vertical Burning Test described in UL-Subject 94. In the 20 mm Vertical Burning Test, after the second contact (10 seconds) with fire, dripping of flaming particle from the test specimen occurred and the test specimen was self-extinguished 3 seconds after the second contact, and the flame retardancy of the test specimen was "V-2".

In the above-mentioned measurements, observation was performed with respect to two strip specimens. The results are shown in FIGS. 1 and 2. The strip specimen shown in FIG. 1 self-extinguished 3 seconds after the second contact (10 seconds) with fire (flame retardancy of this strip specimen was "V-0"). On the other hand, the strip specimen shown in FIG. 2 self-extinguished 6 seconds after the second contact (10 seconds) with fire (the flame retardancy of this strip specimen was also "V-0").

Further, with respect to a predetermined 1 μm×1 μm area of an image obtained in the above-mentioned observation under SPM, wherein component (B) is dispersed throughout the predetermined area, the total area of the metal oxide particles as component (B) was measured. Specifically, a predetermined 1 μm×1 μm area was chosen from the obtained image, and the 1 μm×1 μm area was magnified and printed out on a paper. With respect to the printed paper, portions having the images of the metal oxide particles as component (B) were cut out and weighed. From the weight ratio of the cut-out portions to the printed-out paper prior to the cutting, the total area of the metal oxide particles as component (B) (unit: %) was determined.

COMPARATIVE EXAMPLES 5 TO 9

In each of Comparative Examples 5 to 9, an aromatic polycarbonate resin composition was produced in substantially the same manner as in Example 1 in accordance with the formulation shown in Table 2. With respect to the obtained resin composition, various properties thereof were evaluated in the same manner as in Example 1. The results are shown in Table 2.

TABLE 2

| | | Ex. 4 | Ex. 5 | Ex. 6 | Comp. Ex. 5 | Comp. Ex. 6 | Comp. Ex. 7 | Comp. Ex. 8 | Comp. Ex. 9 |
|---|---|---|---|---|---|---|---|---|---|
| Component (A) | PC-1 [part by weight] | 100 | 100 | 100 | 100 | 100 | 100 | 100 | 100 |
| Component (B) | Oxide particles 1 [part by weight] | 0.3 | 0.3 | 0.3 | 0 | 0.3 | 0 | 0.3 | 0.9 |
| Component (C) | $C_4F_9SO_3K$ [part by weight] | 0.1 | 0.08 | 0.03 | 0.1 | 0 | 0.08 | 0.3 | 0.03 |
| Component (D) | PTFE/AS [part by weight] | 0.2 | 0.6 | 0.6 | 0.2 | 0.2 | 0.6 | 0.6 | 0.6 |
| Other components | I-1076 [part by weight] | 0.03 | 03 | 0.03 | 0.03 | 0.03 | 0.03 | 0.03 | 0.03 |
| | P-168 [part by weight] | 0.01 | 0.01 | 0.01 | 0.01 | 0.01 | 0.01 | 0.01 | 0.01 |
| Average particle diameter of component (B) particles [nm] | | 85 | 92 | 115 | — | 88 | — | 93 | 135 |
| Percentage of component (B) particles which have a particle diameter in the range of 10–200 nm [%] | | 94 | 90 | 74 | — | 89 | — | 83 | 65 |
| Whether or not the oxide particles used have a branched structure | | Yes | Yes | Yes | — | Yes | — | Yes | Yes |
| UL-94 flame retardancy | Sample thickness: 1.50 mm | V-0 | V-0 | V-0 | V-2 | V-2 | V-0 | V-0 | V-0 |
| | Sample thickness: 0.80 mm | — | V-0 | V-1 | — | — | V-2 | V-0 | V-2 |
| | Sample thickness: 2.00 mm | — | 5VB | — | — | — | — | 5VB | — |
| Heat distortion temperature [° C.] | | 126 | 127 | 126 | — | — | — | 125 | 125 |
| Impact resistance [J/m] | | 645 | 630 | 640 | — | — | — | 238 | 420 |
| Flexual modulus [MPa] | | 2,400 | 2,430 | 2,380 | — | — | — | 2,390 | 2,420 |
| Melt stability | Izod impact strength [J/m] | 620 | 625 | 630 | — | — | — | 115 | 245 |
| | Brittle fracture [number of specimen] | 0 | 0 | 0 | — | — | — | 5 | 4 |

Notes:
(1) "—" means that the measurement was not performed.
(2) The PTFE content of PTFE/AS used as component (D) was 50% by weight.

EXAMPLE 7 TO 9

In each of Examples 7 to 9, an aromatic polycarbonate resin composition was produced in accordance with the formulation shown in Table 3. Specifically, the production of the aromatic polycarbonate resin composition was performed as follows.

A melt-kneading of the raw materials was performed by means of a twin-screw extruder (trade name: ZSK-40MC; manufactured and sold by Werner & Pfleiderer GmbH, Germany) (L/D=48) under conditions wherein the cylinder temperature was 270° C., the screw revolution rate was 100 rpm, and the extrusion rate of the resultant resin composition was 75 kg/hr. During the melt-kneading, the temperature of the molten resin composition in the extruder was measured by means of a thermocouple which was provided at the die of the extruder. As a result, it was found that the molten resin temperature was in the range of from 285 to 295° C.

With respect to the raw materials fed to the twin-screw extruder, each of the components indicated in Table 1 other than component (E) were preblended together for 20 minutes using a tumbler, and the resultant mixture was introduced into the extruder by means of a gravimetric feeder. Component (E) was introduced through a side feeder provided at a middle portion of the extruder. Further, during the melt-kneading, a devolatilization was performed through a vent positioned downstream of the above-mentioned side feeder under reduced pressure, namely under a pressure of $3\times10^4$ Pa. After the melt-kneading, the resultant resin composition was extruded from the die in the form of a strand, and the obtained strand was pelletized, thereby obtaining an aromatic polycarbonate resin composition in the form of pellets.

The obtained pellets were dried at 120° C. for 5 hours. With respect to the dried pellets, various properties of the resin composition were evaluated. The results are shown in Table 3.

COMPARATIVE EXAMPLES 10 AND 11

In each of Comparative Examples 10 and 11, an aromatic polycarbonate resin composition was produced in substantially the same manner as in Example 5 in accordance with the formulation shown in Table 3. With respect to the obtained resin composition, various properties thereof were evaluated in the same manner as in Example 5. The results are shown in Table 3.

As apparent from the Examples and the Comparative Examples, the aromatic polycarbonate resin composition of the present invention has excellent melt stability. In addition, even when the resin composition of the present invention is in the form of a thin molded article, the resin composition exhibits excellent flame retardancy.

INDUSTRIAL APPLICABILITY

The flame retardant aromatic polycarbonate resin composition of the present invention is advantageous not only in that it exhibits excellent flame retardancy without using a bromine-containing flame retardant or a phosphorus-containing flame retardant, but also in that it exhibits excellent melt stability without sacrificing the excellent thermal resistance and impact resistance which an aromatic polycarbonate inherently possesses. Thus, the aromatic polycarbonate resin composition of the present invention is commercially very advantageous.

The invention claimed is:

1. A flame retardant aromatic polycarbonate resin composition comprising:
   100 parts by weight of an aromatic polycarbonate (A),
   0.01 to 0.5 part by weight of branched metal oxide particles (B), each independently being a branched metal oxide aggregate or a branched metal oxide agglomerate,
   0.0001 to 0.2 part by weight of an alkali metal salt (C) of an organic sulfonic acid, and
   0.01 to 0.5 part by weight of a fluoropolyrner (D),
   said branched metal oxide particles (B) being dispersed in a mixture of said aromatic polycarbonate (A), said alkali metal salt (C) and said fluoropolymer (D),
   wherein at least 70% of said branched metal oxide particles (B) have a diameter within the range of from 10 to 200 nm.

TABLE 3

| | | Example 7 | Example 8 | Example 9 | Comp. Ex. 10 | Comp. Ex. 10 |
|---|---|---|---|---|---|---|
| Component (A) | PC-1 [parts by weight] | 0 | 100 | 100 | 100 | 100 |
| | PC-2 [part by weight] | 100 | 0 | 0 | 0 | 0 |
| Component (B) | Oxide particles 1 [part by weight] | 0.3 | 0.3 | 0.3 | 0 | 0 |
| Component (C) | $C_4F_9SO_3K$ [part by weight] | 0.06 | 0.15 | 0.1 | 0.15 | 0.1 |
| Component (D) | PTFE/AS [part by weight] | 0.5 | 0.6 | 0.4 | 0.6 | 0.4 |
| Component (E) | GF [part by weight] | 0 | 25 | 6 | 25 | 6 |
| Other components | I-1076 [part by weight] | 0.03 | 0.03 | 0.03 | 0.03 | 0.03 |
| | P-168 [part by weight] | 0.01 | 0.01 | 0.01 | 0.01 | 0.01 |
| | Mold release agent [part by weight] | 0.2 | 0.5 | 0.2 | 0.5 | 0.2 |
| Average particle diameter of component (B) particles [nm] | | 95 | 105 | 97 | — | — |
| Percentage of component (B) particles which have a particle diameter in the range of 10–200 nm [%] | | 78 | 78 | 73 | — | — |
| Whether or not metal oxide particles used have a branched structure | | Yes | Yes | Yes | — | — |
| UL-94 flame retardancy | Sample thickness: 1.20 mm | V-0 | V-0 | V-0 | V-2 | V-2 |
| | Sample thickness: 1.00 mm | V-0 | — | V-0 | — | — |
| Heat distortion temperature [° C.] | | 126 | 139 | 133 | 138 | 133 |
| Impact resistance [J/m] | | 645 | 92 | 58 | 95 | 60 |
| Flexural modulus [MPa] | | 2,400 | 6,150 | 3,100 | 6,050 | 3,150 |

Notes:
(1) "—" means that the measurement was not performed.
(2) The PTFE content of PTFE/AS used as component (D) was 50% by weight.

2. The composition according to claim 1, wherein said branched metal oxide particles (B) are branched particles of at least one metal oxide selected from the group consisting of a silicon oxide, a titanium oxide and an aluminum oxide.

3. The composition according to claim 2, wherein said branched metal oxide particles (B) are branched silicon oxide particles produced by the dry method.

4. The composition according to any one of claims 1 to 3, wherein the surfaces of said branched metal oxide particles (B) are modified with a silicon compound.

5. The composition according to claim 1, which further comprises 5 to 200 parts by weight of an additive (E) selected from the group consisting of a reinforcing agent and a filler.

6. The composition according to claim 5, wherein said additive (B) is at least one substance selected ftom the group consisting of a glass fiber, a carbon fiber, glass flakes, glass beads, glass balloons, a quartz glass and silica.

7. The composition according to claim 1, wherein said aromatic polycarbonate (A) is produced by a transesterification process.

* * * * *